(12) United States Patent
Ohlinger et al.

(10) Patent No.: US 6,798,874 B1
(45) Date of Patent: Sep. 28, 2004

(54) SYSTEM AND METHOD FOR ENABLING CUSTOM TELEPHONE FEATURES ON A PBX SYSTEM

(75) Inventors: George F. Ohlinger, Phoenix, AZ (US); Gary Hoffman, Glendale, AZ (US); Joel Donelson, Phoenix, AZ (US)

(73) Assignee: Inter-Tel, Inc., Tempe, AZ (US)

( * ) Notice: Subject to any disclaimer, the term of this patent is extended or adjusted under 35 U.S.C. 154(b) by 388 days.

(21) Appl. No.: 10/123,945

(22) Filed: Apr. 16, 2002

(51) Int. Cl.$^7$ ................................................ H04M 3/42

(52) U.S. Cl. ........................ 379/201.01; 379/201.04; 379/201.12; 379/207.02

(58) Field of Search ..................... 379/201.01, 201.02, 379/201.04, 201.12, 207.02, 396

(56) References Cited

U.S. PATENT DOCUMENTS

| | | | |
|---|---|---|---|
| 3,651,270 A | 3/1972 | Lee, Jr. et al. | 379/210.02 |
| 4,527,012 A | 7/1985 | Caplan et al. | 379/284 |
| 4,650,932 A | 3/1987 | Komuro et al. | 379/164 |
| 5,012,512 A | 4/1991 | Basso et al. | 379/218.01 |
| 5,526,417 A | 6/1996 | Dezonno | 379/88.22 |
| 5,642,410 A | 6/1997 | Walsh et al. | 379/201.01 |
| 6,615,236 B2 * | 9/2003 | Donovan et al. | 709/203 |
| 2002/0031211 A1 * | 3/2002 | Fullarton et al. | 379/201.01 |

FOREIGN PATENT DOCUMENTS

| | | | |
|---|---|---|---|
| EP | 1 009 149 A2 | 6/2000 | |
| EP | 1 009 149 A3 | 7/2002 | |
| EP | 1355480 A1 * | 10/2003 | H04M/3/42 |
| GB | 2 271 910 A | 4/1994 | |
| GB | 2 349 040 A | 10/2000 | |

OTHER PUBLICATIONS

Siemens, Hicom 300 H V1.0 Communication Server, Siemens Data Sheets. Data Sheet 11/00. Reference No. A31002–H3000–A100–1–7629, Online! Nov. 2000, XP002209078.

Siemens, Caracas Inn Communication Solutions for Hotels and Residential Homes, Siemens Data Sheets. Data Sheet 12/00. Reference No. A31002–E1300–A110–3–7629, Online! Dec. 2000, XP002209156.

Using CTI to Enhance Customer Service, Chambers, Elizabeth, 1998.

CTI 101: A Primer to Computer Telephony, Renaud, Jean, 1999.

An Automated Testing Environment for CTI Systems Using Concepts for the Specification and Verification of Work flows, Niese et al., 2001.

* cited by examiner

*Primary Examiner*—Harry S. Hong
(74) *Attorney, Agent, or Firm*—Michelle Whittington

(57) ABSTRACT

A telephone system and method is provided including a processing system, such as a CTI system, in communication with a PBX and one or more telephone sets. The user selects a pre-programmed canned message, such as a DND message or status-state, from a list of messages and may further define the message with a user-defined message. The PBX recognizes the canned message and funnels the message to the processing system. The processing system matches the canned message and possibly the user-defined message to a software application stored in the processing system and corresponding to the messages. The user may program the software application to perform a specific function which may be stored in the processing system. The software application is launched and the telephone can be returned to a normal operating state regardless of whether the launched application has completed the intended task.

18 Claims, 2 Drawing Sheets

SYSTEM AND METHOD FOR ENABLING CUSTOM TELEPHONE FEATURES ON A PBX SYSTEM

FIELD OF INVENTION

The present invention generally relates to a system and method for enabling custom telephone features on a PBX system and, in particular, to a system and method for enabling custom telephone features by using a DND status.

BACKGROUND OF THE INVENTION

In the 1970s, very basic messaging capabilities to customer-owned Private Branch Exchange (PBX) systems was introduced. For instance, a switchboard attendant delivered a signal to a telephone, e.g., in a hotel room, causing a lamp mounted on the telephone to illuminate. This technique was used to inform the guest that there was a "message waiting" or the telephone was in a "Do-Not-Disturb" (DND) mode. The messaging information provided by these early systems was limited to what could be conveyed with a flashing light initiated by the system's attendant.

Various attempts have been proposed to provide telephone systems with additional features. However, these systems often use a host computer to control the entire telephone system and do not allow the individual telephone user to control and set desired functions specific for a particular telephone. Moreover, these systems are commonly designed to operate with basic telephones and not Multi-Function Telephone Sets (MTS).

With the introduction of Computer Telephone Integration (CTI) technology, telecommunications and information processing converged by linking computing (data) with telephony (voice). CTI is primarily used in call centers but also has applications for the general office environment. More specifically, CTI links telephone switches with computers to coordinate computer information and telephone call handling and automatically adds relevant data, fax, graphics, and/or video to voice communications. CTI devices, such as agents, trunks and telephones, are identified by the switch and "monitors" set-up on each of them. Once set-up, any event occurring on a monitored device is transmitted to the host on the CTI link. Similarly, relevant events occurring in the host are transmitted to the switch on the same link. This call control can either be achieved by the physical linking of each telephone to each PC (first-party CTI connection) or having one intelligent dedicated link between the host computing system and the telephone system (third-party CTI connection).

Although the combination of CTI and PBX systems is generally well known, the available functionality is typically limited to the pre-programmed PBX functions. In other words, any customizing to the telephone system typically requires reprogramming the PBX original software to accommodate.

Accordingly, a telephone system that is versatile to each of the system user's needs is desired. In particular, a telephone system that enables each of the system's users to customize telephone features without having to disrupt or alter the original PBX functioning is needed.

SUMMARY OF THE INVENTION

A telephone system for enabling custom telephone features on a PBX system includes a processing system in communication with the PBX and one or more telephone sets. A user selects one of a plurality of pre-programmed messages stored in the PBX and may further define the message with a user-defined message. The PBX recognizes the pre-programmed message and funnels the message(s) to the processing system, thus a direct communication between the telephone set and the processing system is established. The processing system matches one or both of the received messages with a software application stored on the processing system which corresponds to the message(s). The application is launched in response to the message(s) and the telephone is returned to a normal operating state.

In another embodiment, a data signal between a telephone set and a CTI system includes instructions for enabling the CTI system to recognize activation of a status-state of the telephone set. In one particular embodiment, the status-state includes a canned message and a user-defined message. The signal further includes instructions for enabling the CTI system to identify an application stored in the CTI corresponding to the status-state of the telephone set and instructions for enabling the CTI system to launch the application. The signal may further include instructions for enabling the CTI to cause the removal of the status-state of the telephone, and may include instructions for enabling the CTI to control the functioning of the telephone set.

In yet another embodiment of a system for enabling custom telephone features on a PBX system, a user site, i.e., a telephone set, receives a first event from a user representative of a status-state. A confirmation of the first event may be displayed to the user and the first event is transmitted to the PBX. The PBX receives the first event, recognizes the event and communicates the first event to a processing system. Upon receipt of the first event, the processing system identifies an application stored on the processing system which corresponds to the first event and transmits a second event to the user site in response to the first event.

BRIEF DESCRIPTION OF THE DRAWINGS

These and other features, aspects and advantages of the present invention may be best understood by reference to the following description taken in conjunction with the accompanying drawings.

DETAILED DESCRIPTION

The invention provides an improved system and method for enabling custom features on a telephone set within a PBX (private branch exchange). Although the system and methods disclosed herein are suitable for enabling custom telephone features in a variety of applications, the present invention may be conveniently described with reference to the hotel/guest relations industry, and more particularly to custom telephone features available to Multi-Function Telephone Sets (MTS) located in hotel rooms. It should be recognized that the invention has equal application to various other industries outside of the hotel and guest relations domain, such as car dealerships, hourly billing professionals, and security applications.

In general, the invention provides a communications pathway between a telephone user and an external software application, e.g., Computer Telephone Integration (CTI), in a PBX system, without interfering with or altering the normal operation of the telephone set or the PBX system's original software. Specifically, the operation of the invention includes modification of functions commonly available on a telephone system, e.g., Do-Not-Disturb (DND) status, to trigger applications installed on an external computer. The applications may be programmed to, for example, display a message on the telephone, trigger another application to perform a specific task, toggle the telephone's state for a predetermined or undetermined time, and any number of other tasks as needed for a particular embodiment.

Figure 1:
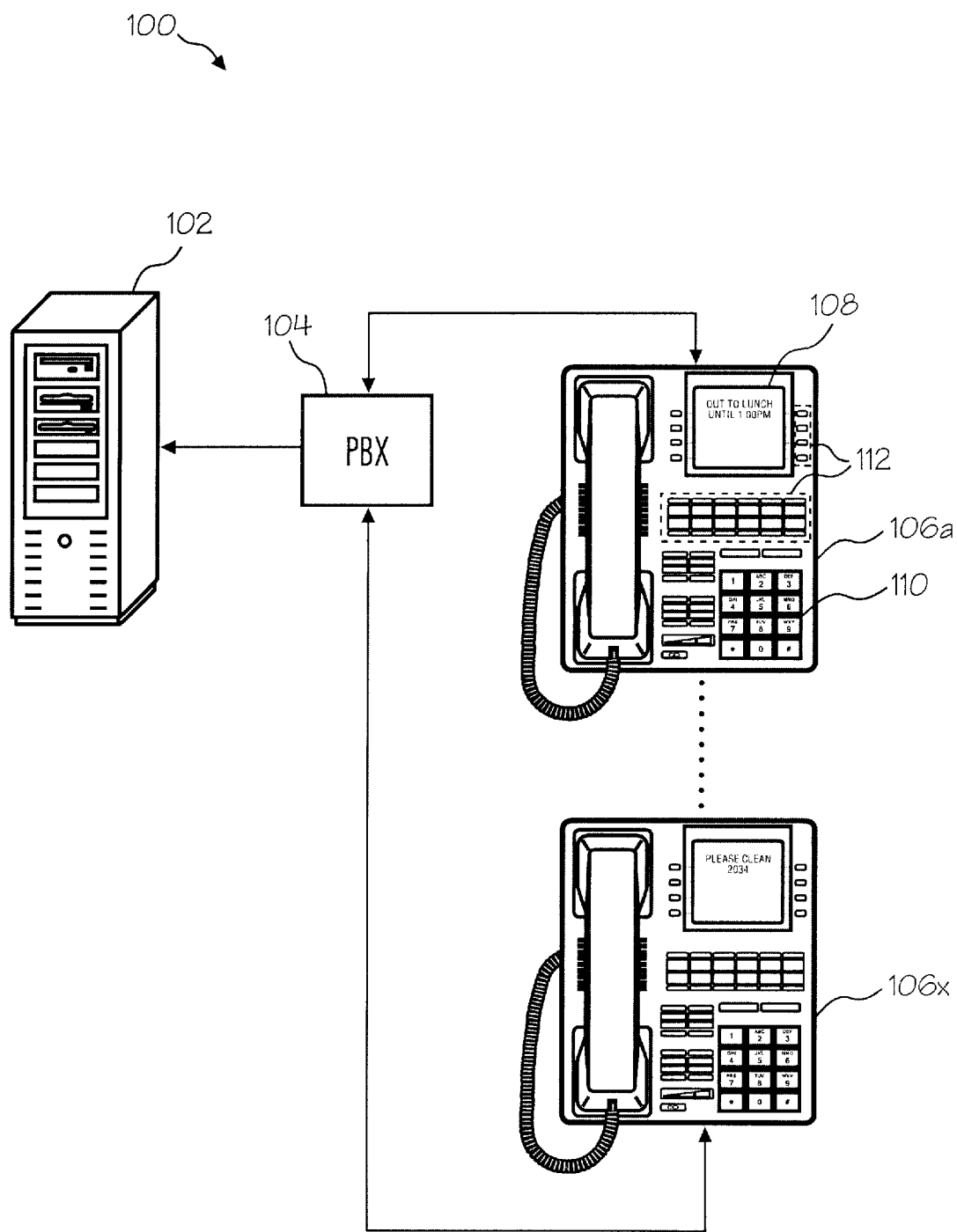
FIG. 1 illustrates an exemplary custom feature enabling system in accordance with the invention.

FIG. 1 illustrates a custom feature enabling system 100 in accordance with one embodiment of the invention. System 100 includes a processing system 102, a PBX system 104, and one or more telephone sets 106a–106x. Processing system 102 includes, for example, a CTI computer or processing system having software programs/applications suitably stored thereon. The general structural and/or functional aspects of CTI technology are well known in the communications industry, and therefore will not be discussed in detail. For additional background information on CTI, refer to various publications by the IEC (International Engineering Consortium) Annual Review of Communications, such as: "Using CTI to Enhance Customer Service" by Elizabeth A. Chambers (1998); "CTI 101: A Primer to Computer Telephony" by Jean Renaud (1999); and "An Automated Testing Environment for CTI Systems Using Concepts for the Specification and Verification of Workflows" by Oliver Niese et al. (2001), the disclosures of which are incorporated by reference. For additional information and specific examples of CTI systems, refer to U.S. Pat. No. 5,642,410 entitled, "Call Processor for a Computer Telephone Integration System" issued Jun. 24, 1997, the disclosure of which is incorporated by reference.

Processing system 102, such as a CTI system, preferably interacts and assists PBX 104. For example, processing system 102 may be configured to assist in the routing of telephone calls, provide information to the call recipient (e.g., "screen-pops"), assist in controlling the operation of the telephone system, and monitor events for system 100. In addition, processing system 102 is suitably configured to include software programs/applications which may be created, upgraded, or otherwise modified without having to revise the standard software originally provided by PBX 104 original equipment manufacturer (OEM). In this manner, software located on processing system 102 can be enhanced to include custom features available for each telephone set 106 without involving the telephone system's OEM. This process will be described in greater detail below.

The communications link between processing system 102 and PBX 104 may include any suitable communication link currently known or discovered to facilitate two-way communication between a processing system and a PBX. No additional network communications are required for the invention to be implemented in an existing telephone system; rather, the invention utilizes any suitable existing communications links. Suitable communications links include, but not limited to, wired and wireless networks, Ethernet, Token Ring, fiber optic protocols, Internet protocols, Asynchronous Transfer Mode (ATM), a local area network (LAN), wireless area network (WAN), wireless local area network (W-LAN), intranet, a telephone network, the extranet, and any other CTI-compatible connection.

PBX 104 includes any suitable PBX system which permits communication with an external processing system and serves one or more telephone sets. PBX systems are generally well known and provide telephone and messaging services as needed to telephone sets and users. Provided services typically focus on the delivery of external and internal telephone calls to a commercial business. In general, PBXs are telephone exchanges having special functions directed towards business users. Modern PBXs also provide integrated voice mail, hands free intercom calls, call center functions, complex system networks, and additional features using external computer control. Audio and control paths are extended to the telephone sets from a PBX switching complex using wiring connections. Local users may also be connected to the PBX using headsets and a variety of wireless devices. In a similar sense, the PBX may be any customer-owned switching apparatus that is used to connect real-time voice or multimedia communications from user-to-user, regardless of the technology employed, such as time division multiplexing, packet switching, optical switching, or any combination thereof.

Telephone set 106 preferably includes a telephone having a display 108, a keypad 110 and numerous function keys 112. In one particular embodiment, telephone set 106 may include a MTS system of the type having hardware and software configured to permit multiple function capabilities. For example, function keys 112 (either hard keys or soft keys), when depressed or otherwise triggered, may activate hardware of telephone 106 and/or software suitably linked to telephone 106 causing various desktop-related functions to occur. Typical features conventionally available on desktop telephones include call forwarding, Do-Not-Disturb, conferencing, call waiting, hold, transfer, mute message indicator, and other features that may be activated by function keys associated with a phone system, display and/or telephone set. In addition, each function key may include a matching indicator light that illuminates upon activation of the associated function key or some other form of notice to the user that a key has been activated. Display 108 permits the telephone user to visually read the operations associated with function keys 112 and any commands received from PBX 104 or processing system 102.

In another embodiment, telephone set 106 may include a wireless remote device capable of connection to PBX 104. Preferably, the remote device includes a display, keypad, and various function keys as previously described.

Although not shown or described, it should be appreciated that additional connections, links, adapters, and/or adapter interfaces may occur between the telephone set and the PBX or the PBX and the processing system. For instance, depending upon the telephone set and communication links, additional network adapters may be included between the PBX and the processing system, and translation servers may be used between the telephone set and the PBX.

In one particular embodiment, system 100 includes an OAI (open architecture interface) protocol. OAI facilitates the monitoring of events occurring on the phone system and permits control information to be routed within system 100. Although not shown in FIG. 1, it should be appreciated that one or more processors, e.g. CTI processors, may be included in processing system 102. For example, one processor may include a suitable application that sets up the system OAI stream to enable multiple applications to share OAI. In this manner, the set up processor may include programming to control the port sharing process for the various applications included in the system. Alternatively, additional OAI port access points may be added to the system and applications may be dedicated to each port.

As previously mentioned, the invention involves modification of one or more functions currently available on a telephone to trigger applications installed on an external computer(s), e.g., processing system 102. In other words, the invention utilizes the functionality already in place for a MTS phone system, and expands this functionality to provide the user with additional "customized" features. A detailed description of one such commonly available function and the focus of the invention's modifications, will follow.

Currently, phone systems having MTS phones, or the like, typically include a DND (do-not-disturb) status which, when activated, is generally recognized by the processing system and triggers the processing system to respond to the user's pre-selected command accordingly. For example, in a conventional phone system, the DND status allows the user to select an option from a menu of predetermined "action" items (hereinafter, referred to as "canned" messages), and then to define a second message that generally coincides with the selected option (hereinafter, referred to as "user-defined" messages). In general, the canned messages are pre-programmed, predetermined and include a preset number of options for the user to choose from.

Table 1 below provides a list of fifteen exemplary canned messages available to a telephone user. It should be appreciated that the number of canned messages, as well as the predetermined message can vary depending upon the application.

TABLE 1

DND Canned Messages

01 - In Meeting Until
02 - On Vacation Until
03 - Call Me At
04 - Away From Desk
05 - Unavailable
06 - Out of Town Until
07 - Telecommuting
08 - Out Until
09 - Leave Voice Mail
10 - On Break
11 - Gone Home
12 - Out to Lunch
13 - Out of Office
14 - At West Bldg.
15 - Page Me In general, the user places the phone in DND status (e.g., by depressing a function key, e.g., pre-assigned function key, or keying in a number sequence) and then chooses one of the predetermined canned messages. Using a MTS telephone having a display, the user is typically able to view the selected option on the display. The user may then key in an additional message to further define the canned message. For example, the user may choose canned message #08 causing the words "OUT UNTIL" to appear on the telephone display. The user may then manually enter, e.g., using the telephone keypad, the words "NEXT MON" to indicate the user will be out of the office until next Monday. Thus, appearing on the display would typically be two lines of messaging; the canned message on one line and the user-defined message on a second line (display 108 of FIG. 1 illustrates the two line messaging).

In a conventional phone system, the DND status, regardless of the canned message chosen, triggers the processing system to instruct the PBX to place the phone in a predetermined state, such as a non-ringing state. Other system users may be able to view the user's DND messages (e.g., out of the office until next Monday) on any suitable display device, such as a telephone or a workstation comprising a personal computer linked to a telephone. External phone calls received by the system may be automatically forwarded to voice mail if the called number is in any one of the DND status'. In general, the conventional phone system recognizes the DND command of the user phone, places the phone in the DND status and typically does nothing more. In other words, once the system places the phone in DND status, the phone will remain in this status until the user notifies the system otherwise. In fact, while the user has the option to enter an additional command to further define the chosen DND option, i.e., user-defined message, this message is not detected by the phone system and is generally irrelevant to the operation of the conventional system. In this manner, placing the phone in a DND status in the conventional phone system may be considered a passive event, i.e., nothing further occurs on the system once the phone is placed in DND status regardless of the canned message or user-defined message. These messages are provided merely for the benefit of other system users to obtain information on the whereabouts of a user, they are generally not identified by the system beyond the initial canned message which, regardless of the selected option, is recognized only as a DND message.

The custom feature enabling system of the invention utilizes the provided functionality of an existing phone system as it pertains to the DND status as just described; however, a system in accordance with the invention extends the functionality of the existing phone systems to provide additional features to the user. In this manner, the following detailed description of exemplary embodiments of the invention may use terms and functions which are general to an existing phone system and may have just been described. It should be noted that the DND status as intended for use herein is a status-state indicator and is not intended to imply merely a state of do-not-disturb. For instance, a status-state indicator may signify a notification that a telephone or system event is or has occurred.

Figure 2:
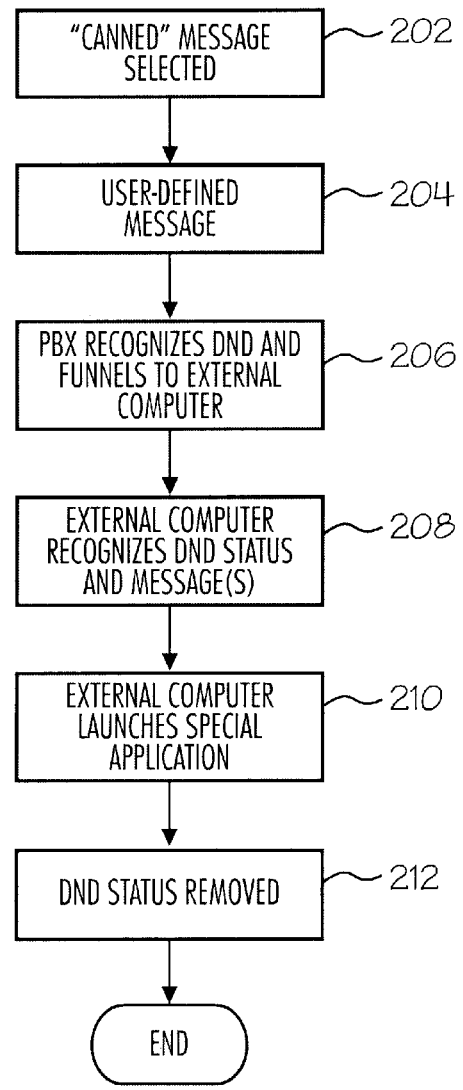
FIG. 2 is a flow chart of an exemplary operation of a custom feature enabling system of the invention.

FIG. 2 is a flow chart illustrating an exemplary operation of a custom feature enabling system of the invention. Initially, the user chooses one of the canned messages available on the phone system (step 202). As previously discussed, the canned messages generally include pre-programmed, predetermined and a preset number of options for the user to choose from, for example as shown in exemplary Table 1. The canned messages are generally field-programmable from the PBX OEM and may be stored on the PBX system. The user may then enter a custom message or user-defined message to further detail the canned message (step 204). Preferably, the user is able to view the selection and keyed-in message on a suitable display unit.

PBX 104 identifies the data as a DND status message and simply funnels the data through to an external computer, e.g., processing system 102 (step 206). Processing system 102 recognizes the DND request from the user phone, which is passed through PBX 104 (step 208). Hence, a direct link between telephone 106 and processing system 102 is established (although PBX 104 may be between the link, the PBX is acting merely as a data pass-through).

Unlike the conventional phone system, system 100 includes additional software applications which correspond to the user's selections and/or keyed-in messages. The various software applications stored on processing system 102 may be created and/or upgraded without having to revise PBX 104 software originally provided by the PBX OEM. In this sense, software applications, which may be programmed and installed on processing system 102 to perform a specified function, are launched in response to the selected canned message and/or the user-defined message (step 210). The number of available applications is limited only by the storage capacity of processing system 102. Finally, depending on the particular programming of the application, processing system 102 may instruct PBX 104 to clear the DND state and return the telephone to normal operating status (step 212). In one particular application, the telephone may resume normal operation almost immediately after processing system 102 receives the user's commands and responds to the commands accordingly.

In one particular example, the user may select canned message #12 OUT TO LUNCH from a list of canned message such as exemplary Table 1. Preferably, the words "OUT TO LUNCH" will appear on a suitable display for the user to view. The user may then enter a user-defined message to appear on a separate line or display area than the canned message, such as "1:00". PBX 104 monitors the activity on system 100 and quickly recognizes the entered data as a DND message and passes the information to processing system 102. A special application within processing system 102 may recognize the selected canned message (e.g., #12) and launch an application that is sensitive to the canned entry portion as well as the user-defined portion. Processing system 102 may return a message to telephone 106 to update the display to read "OUT TO LUNCH" "BACK AT 01:00 PM". Alternatively, an application may be programmed to read the user-defined entry as a starting time, or any other combination of desired displayed information.

In another embodiment, processing system 102 may identify the selected canned message (e.g., #12 OUT TO LUNCH) as an instruction to launch a special application to instruct PBX 104 to forward incoming external and/or internal calls intended for telephone 106 to a different number. For instance, the user may predefine certain canned messages to trigger applications within the system to respond in a certain way, such as automatically forward incoming calls to a mobile telephone number. Thus, in this particular embodiment, processing system 102 recognizes the selected canned message, launches a special application corresponding to that particular canned message (and to that particular user and/or telephone), and instructs PBX 104 to forward incoming calls to the phone number provided in the application. Additionally, processing system 102 may identify the user-defined portion of the message as a time to continue the specified action. For example, if the user enters 01:00 PM, then processing system 102 may continue to instruct PBX 104 to forward incoming calls until the time reaches 1:00 PM. Processing system 102 may also instruct PBX 104 to clear the DND state and return telephone 106 to normal operating status once 1:00 PM is reached. Of course, should the user return from lunch earlier than 1:00 PM, the user can quickly key-in to return the telephone back to a normal state.

The user need only select and/or enter a simple message on a telephone to identify a DND state. An attached processing system 102 recognizes the message and completes an interaction with the user. The only feature provided by PBX 104 OEM is the ability to pre-program the canned messages, a function common to PBX OEM. The messages associated with each canned message or DND state can be easily modified to customize the desired response. Because the applications running on processing system 102 read information from each individual telephone 106 after the user selects a particular DND state, processing system 102 reads only one of the predetermined number of DND states programmed by the installer. This feature allows the processing system supplier to define which applications may be run by users of a particular PBX system. Thus, customers having a network of PBXs linked to a common processing system are able to define different DND messages for each PBX system, and yet maintain a common set of processing applications to service the entire enterprise. Of course various other advantages and embodiments will become readily apparent to those skilled in the telecommunications industry, or the like, from reading this disclosure.

In another particular embodiment, processing system 102 may recognize the messages from the user and launch a special application or process which may take a short period of time for system 102 and/or system 100 to execute. In this example, processing system 102 may return an instruction to telephone 106 causing a momentary display of "PLEASE WAIT" or similar message, indicating to the user that the commands are being processed.

The user may be provided an option to open a "transparent" session with processing system 102. As used herein, "transparent" refers to the flow-through function of PBX 104 and it should be realized that the transparency of the option is with respect to PBX 104. Display 108 may indicate that the opportunity to access processing system 102 is now available to the user. If the user selects this option, for example by choosing a function key, telephone 106 is linked to a transparent connection with processing system 102. Display 108 as well as some or all of the function keys, e.g., soft keys, may now be under the control of processing system 102 until the user completes the desired task and exits the application and session. During this open session with processing system 102, the user may define a special application to be launched in connection with a chosen canned message and/or user-defined message. The user may define soft keys for use during a particular application. The user may be shown an "EXIT" menu option on the display which may be used to conclude the open session and return telephone 106 to normal operation. The special application defined by the user during the session may be stored on processing system 102 to be launched whenever the particular canned and/or user-defined message is selected, or may be stored to be launched immediately as a one-time application.

In yet another embodiment, system 100 may include one or more phantom extensions (not shown) in lieu of, or in combination with, telephone set 106. Phantom extensions are often times used for workers that do not need a station that exists as a physical telephone assigned to a phone number or extension. These extensions do not correspond to physically equipped system ports but as a logical reference for dialing and other forms of incoming access in conjunction with system 100. These extensions require no hardware resources and may provide a means to assign directory numbers, class of service, group member assignments, and access rights to these extensions.

Alternatively, a phantom extension number may be programmed by the system installer to correspond to a particular event, such as a "customer call-in" or "help". In this particular embodiment, system 100 is conveniently described with respect to an automobile dealership application; however, it should be appreciated that this embodiment is in no way limited to such an application and this description is provided merely to fully understand the present embodiment. In general, when a prospective customer calls an automobile dealership a receptionists answers the call and forwards the prospective customer to an available agent. In a custom feature enabling system of the invention, the receptionist may forward the prospective customer to a phantom extension number. Agents are then notified of the "waiting" customer, e.g., by an audible announcement, teleprompt message, or any other suitable messaging means. An available agent simply dials the phantom extension number which is recognized by processing system 102. The first agent to reach the phantom number is connected to the prospective customer and an acknowledgement may be displayed on the agent's telephone. By interacting with phantom extensions to retrieve calls in this manner, extra hardware port resources are generally not required.

In still another embodiment of the automobile dealership application, in a similar manner as just described, a receptionist may transfer a prospective customer call to a phantom extension number, causing some suitable messaging means to alert agents that a customer is waiting. However, in this example, available agents, using telephone 106, choose a particular DND status (e.g., a canned message) and key in a user-defined message. The canned message may be recognized by PBX 104 as a DND status and forwarded to processing system 102. Processing system 102 recognizes the particular canned message and may launch a particular application in response. For example, processing system 102 may transmit a message to the agent's telephone to enter the agent's I.D. number. This I.D. number may correspond to the user-defined portion of the commands and therefore processing system 102 may not display the request if the agent already entered this information. Processing system 102 may record the agent's information, instruct PBX 104 to remove the agent's telephone from DND status, and to connect the waiting prospective customer with the agent's telephone 106. Various other applications of this particular embodiment are contemplated, such as a billing tool for law firms, accountants and other hourly billing professionals.

HOTEL/GUEST RELATIONS EXAMPLES

The following examples provide additional applications for a custom feature enabling system of the invention for use in the hotel/guest relations industry. It should be appreciated that the following examples are merely illustrative of possible applications of the invention and are not intended to be limiting in any way.

A custom feature enabling system and method in accordance with the invention offers various uses within the hotel/guest relations industry. For instance, various applications of the invention may benefit the hotel staff, such as housekeeping and maintenance, while other applications may benefit the hotel guest.

In one particular embodiment of a custom feature enabling system in accordance with the invention and a hotel/guest relations application, the hotel guest may use the systems and methods of the invention as previously discussed and further detailed below, to initiate hotel services from the privacy of the hotel room.

With continued reference to FIGS. 1 and 2, the following is an exemplary operation of a custom feature enabling system of the invention (e.g., system 100) to initiate a wake-up call feature for a hotel user. The following description details initiating a wake-up call by a guest from a hotel room, however, it should be realized that a wake-up call may also be initiated through a user interface, i.e., from the hotel front desk.

To initiate a wake-up call from the room, the user first toggles the phone into a specific DND state by choosing a "canned" message (step 202) and a user-defined message (step 204). The canned message may be chosen from a list of pre-determined, pre-programmed messages, such as previous Table 1, except the messages would generally be specific to the hotel/guest relations industry. For example, the user may remove the handset or otherwise cause the phone to go "offhook", then choose message #01 WAKE-UP CALL from a number of options and depress the number one key on the phone keypad, or use any other means of number entry. The user may then enter a user-defined message to indicate the time at which the user desires the wake-up call. For example, if the user wanted a 7:00 AM wake-up call, a series of alpha-numeric characters may be entered on the keypad to indicate the desired time (e.g., "07*", where the asterisk may indicate AM verses "#" for PM).

The PBX recognizes the DND status and funnels the data to the external computer, such as processing system 102 (step 206). The external computer recognizes and identifies the particular DND status as a wake-up call (step 208). The external computer then launches a special application corresponding to the wake-up call status (step 210). This application may include, for example, registering the wake-up call activity on a log. In addition, the application may cause the system to respond with an indication, via a user interface, whether a wake-up call is pending for a particular room. For example, a guest may ring the front desk and confirm that a wake-up is pending for a particular time.

Finally, the system (or processing system) toggles the phone out of DND status (step 212) to allow the user to continue to use the telephone for additional functions or normal calling. Preferably, the DND status is removed shortly after the user completes the wake-up call request and the system registers the command. Alternatively, the user may send a command to the system to remove the DND status (it should be noted that the user may activate the removal of the DND status in other applications and embodiments described herein as well). In this example, the user may wish to leave the phone in a DND or do-not-disturb status to avoid receiving calls during the night. Shortly before the set wake-up time, the system may remove the DND status and cause the telephone in the room to ring. Alternatively, the system may use a DND override function.

In one particular embodiment of a wake-up call application, the system includes one or more "dummy" telephones designated as wake-up call telephones to handle the actual ringing of the rooms. At the registered wake-up call time, the system may instruct one of the wake-up call telephones to ring the telephone in the user's room thereby fulfilling the wake-up call function.

In another embodiment, the user may employ similar steps to request housekeeping, room service, maintenance, extra towels, an ironing board and various other guest relations services. For example, the user may toggle the room telephone into a particular DND state by choosing a canned message from a list of messages. For instance, the user may choose the message for MAINTENANCE and key in the appropriate number, i.e., a canned message (step 202). The user may then define the type of maintenance desired by keying in words using the telephone keypad, e.g., IRONING BOARD (step 204). The remaining steps may be similar to the steps of flow chart 200 with the addition of the processing system recognizing the particular DND status as a maintenance call and forwarding the message to the appropriate maintenance telephone, personnel or system.

In yet another embodiment, the hotel staff may also benefit from a custom feature enabling system of the invention. The following example relates to housekeeping personnel; however, as those skilled in the art will readily recognize, there are various other hotel/guest relations personnel which may also benefit from the described system and methods.

In a housekeeping embodiment, the maid may cause the telephone in the uncleaned room to toggle into a particular DND state. For instance, the maid may choose a particular canned message, such as CLEANING IN PROCESS from a list of predetermined, preprogrammed messages (step 202). The maid may then enter a user-defined message to further define the canned message, for example, the maid's employee number or I.D. (step 204). The remaining steps may be similar to the steps of flow chart 200. In this particular example, it may be preferred to remove the room's telephone from DND status once the system registers that the room is in the process of being cleaned. In this manner, other system users may be able to ring the room's telephone, for example, the front desk to check on the status of the room, and the maid would be able to respond. In addition, the system may launch a special application to place incoming calls to the room into a voice message during the time the room is in the process of being cleaned. Once the maid is done cleaning the room, she may key-in a different number to indicate the room is cleaned.

In yet another embodiment of the hotel/guest relations applications, the system may further include additional property management software or the like, in communication with the processing system. In this manner, the processing system may send updates on particular telephones and/or rooms (e.g., the room status) to the property management software.

It should be appreciated that the particular implementations shown and described herein are illustrative of various embodiments of the invention including its best mode, and are not intended to limit the scope of the present invention in any way. Indeed combinations and enhancements of the disclosed systems and methods are contemplated which may allow telephone system users additional flexibility when communicating with external applications; for example, complex selections of options, later acknowledgement of processes that have long execution times like lengthy searches, and setting up systems that monitor for particular events and trigger alerts at a later time.

For the sake of brevity, conventional techniques for signal processing, data transmission, signaling, and network control, and other functional aspects of the systems (and components of the individual operating components of the systems) may not be described or illustrated in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements without departing from those principles. These and other changes or modifications are intended to be included within the scope of the present invention, as expressed in the following claims.

What is claimed is:

1. A telephone system comprising:
   a public branch exchange (PBX);
   a processing system in communication with said PBX;
   one or more telephone sets in two-way communication with said PBX and with said processing system; and
   a plurality of pre-programmed messages stored in said PBX; and
   a plurality of software applications stored in said processing system, each of said software applications corresponding to one of said pre-programmed messages and a user of said telephone set selecting one of said pre-programmed messages,
   wherein said PBX recognizes said one of said pre-programmed messages selected from said telephone set, and
   wherein said processing system matches said one of said pre-programmed messages selected by said user with at least one of said plurality of software applications and launches said application in response to said pre-programmed message.

2. The telephone system of claim 1, wherein said PBX permits a transparent communication between said telephone set and said processing system.

3. The telephone system of claim 1, further comprising said user of said telephone set entering a user-defined message wherein said processing system launches said application in response to both said messages.

4. The telephone system of claim 1, wherein said telephone set includes a display and during the launch of said application, said processing system controls said display.

5. The telephone system of claim 1, wherein activation of said pre-programmed message places said telephone set in a status-state.

6. The telephone system of claim 5, wherein said processing system initiates removal of said status-state and returns said telephone set to a normal operating condition regardless of whether said launched application has completed an intended application function.

7. A telephone system comprising:
   a public branch exchange (PBX);
   a computer telephone integration (CTI) system in communication with said PBX;
   a plurality of multi-function telephone sets in two-way communication with said PBX and with said CTI system; and
   a plurality of software applications stored in said CTI system, each of said software applications corresponding to a status-state message stored in said PBX and said status-state message being specifically selectable by one of said telephone sets, and
   wherein a user of one of said telephone sets selects said status-state message which is recognized by said PBX and said PBX causes one or more associated events to occur from said one of said telephone sets and said CTI system, and
   wherein said CTI system identifies said status-state message from said one of said telephone sets and launches said software application corresponding to activation of said status-state message.

8. The telephone system of claim 7, wherein said status-state message comprises a do-not-disturb (DND) message.

9. The telephone system of claim 7, wherein said two-way communication between said multi-function telephone sets and said CTI system comprises a transparent communication link.

10. The telephone system of claim 7, wherein said CTI system initiates removal of said status-state and returns said telephone set to a normal operating condition regardless of whether said launched application has completed an intended application function.

11. A computer-based method providing a system for enabling custom telephone features on a PBX system, said method comprising:

at a user site comprising a telephone set,
- (a) receiving a first event from a user representative of a status-state;
- (b) displaying a confirmation of said first event in response to the received user's event;
- (c) transmitting said first event to said PBX;

at the PBX,
- (d) receiving said first event from said user site;
- (e) recognizing said first event;
- (f) communicating said first event to a processing system;

at the processing system,
- (g) receiving said first event from said user site via said communication;
- (h) identifying an application stored on said processing system corresponding to said first event from said user site; and
- (i) transmitting to said user site a second event in response to said first event.

12. The computer-based method of claim 11, further comprising initiating, from the processing system, the removal of said status-state at said user site.

13. The computer-based method of claim 11, further comprising at the processing system, temporarily controlling a display function of said telephone set.

14. The computer-based method of claim 11, wherein said first event comprises a pre-programmed message selected by said user.

15. The computer-based method of claim 11, wherein recognizing said first event at the PBX comprises identifying said first event as a pre-programmed message stored in said PBX.

16. The computer-based method of claim 11, wherein said processing system comprises one or more computer telephone integration systems.

17. The computer-based method of claim 11, wherein said communicating said first event from the PBX to the processing system comprises establishing a transparent communication link.

18. A method for enabling a user to create custom telephone features on a PBX system using a multi-function telephone set (MTS), the method comprising:

receiving, at said PBX, a first data message from said MTS representative of a pre-programmed status-state;

establishing a message transport link between said MTS and a computer telephone integration (CTI) system;

receiving, at said CTI system, said first data message and a second data message, said second data message representative of a user-defined message;

identifying, at said CTI system, a stored software routine corresponding to said messages, said stored software routine being defined by said user; and launching said stored software routine.

* * * * *